US005523916A

United States Patent [19]

Kaczmarek

[11] Patent Number: 5,523,916

[45] Date of Patent: Jun. 4, 1996

[54] SURGE ARRESTER WITH THERMAL OVERLOAD PROTECTION

[75] Inventor: Richard T. Kaczmarek, Chicago, Ill.

[73] Assignee: Reliance Comm/Tec Corporation, Mayfield Heights, Ohio

[21] Appl. No.: 253,391

[22] Filed: Jun. 3, 1994

[51] Int. Cl.[6] .......... H02H 3/22

[52] U.S. Cl. .......... 361/119; 361/124; 361/129

[58] Field of Search .......... 361/119, 55, 103, 361/104, 124, 91, 129

[56] References Cited

U.S. PATENT DOCUMENTS

| | | | |
|---|---|---|---|
| 3,849,750 | 11/1974 | Baumbach et al. | 337/32 |
| 4,314,302 | 2/1982 | Baumbach | 361/119 |
| 4,321,649 | 3/1982 | Gilberts | 361/119 |
| 4,325,100 | 4/1982 | Baumbach | 361/119 |
| 4,901,188 | 2/1990 | Gilberts | 361/119 |
| 5,195,015 | 3/1993 | Kaczmarek | 361/119 |

*Primary Examiner*—A. D. Pellinen
*Assistant Examiner*—Sally C. Medley
*Attorney, Agent, or Firm*—Trexler, Bushnell, Giangiorgi & Blackstone Ltd.

[57] ABSTRACT

A surge arrester assembly includes an electrically conductive container having disposed therein a surge arrester and a meltable element. The surge arrester has a first electrode in electrical contact with the container and a second electrode not in electrical contact with the container. The meltable element is an electrically conductive element in thermal contact with the surge arrester. The meltable element is located and configured so as to melt in response to a selectable level of thermal energy generated by the surge arrester, in such a manner as to create an electrical short circuit between the first electrode and the second electrode.

18 Claims, 3 Drawing Sheets

SURGE ARRESTER WITH THERMAL OVERLOAD PROTECTION

BACKGROUND OF THE INVENTION

This invention is directed generally to a novel and improved thermal overload apparatus, and more particularly to apparatus for shorting an electrical line to ground in response to a thermal overload condition.

While the invention may find other applications, the description will be facilitated by particular reference to the use of a thermal overload apparatus for creating a short circuit to ground in response to a thermal overload of a surge arrester device. Surge arresters are commonly used in communications equipment, and in particular in telecommunications equipment, for shorting overvoltage conditions to ground, to protect the communications equipment. Typically, such surge arrester devices are coupled between a line, running to the equipment to be protected, and ground. In normal operation, the voltage and current on the line will reach the equipment unaffected by the surge arrester device. However, upon the occurrence of an overvoltage of a preselected magnitude, the surge arrester device will short the overvoltage to ground, preventing it from reaching the equipment.

Such surge arresters may take various forms. In the telecommunications field, so-called gas tube arresters have frequently been utilized. These gas tubes include a sealed tube or canister having a pair of electrodes separated by an inert gas-filled arc gap. When the voltage or electrical potential across these electrodes reaches a preselected level, an arc will form, thereby shorting the electrical potential across the electrodes. Normally, one electrode is coupled to the line to be protected and the other electrode to ground. The voltage level at which arcing occurs can be selected by selection of the width of the arc gap between electrodes as well as by selection of the inert gas filling the arc gap.

Similar arc gap protectors are also provided in the form of a pair of carbon electrodes separated by an air gap, which does not require a sealed container. Similar considerations apply, with the width of the arc gap across the carbon electrodes determining the arcing or breakdown voltage of the device.

More recently, solid state (thyristor or diode) devices have also been utilized in surge arrester applications, taking advantage of the reverse voltage breakdown properties of such devices. That is, a solid-state device is coupled between a line to be protected and ground, such that an overvoltage condition on the line meeting or exceeding the reverse breakdown voltage of the solid state device will be shorted to ground.

In some applications, additional backup devices or mechanisms have been provided. For example, in the case of gas tubes, often a secondary air gap has been provided. Usually such a secondary air gap is provided by using an additional conductive container to house the gas tube, and shaping this container so as to define an air gap between an inner wall of a the conductive container and one of the electrodes of the gas tube. Typically, such an air gap is sized so as to have an arcing voltage somewhat higher than the arcing voltage across the gas tube, in order to act as a backup device in the event of failure of the gas tube, for example by loss of the inert gas in the arc gap within the gas tube itself.

In addition to the foregoing, such protectors have sometimes employed various overcurrent protection arrangements in order to shunt across the surge arrester, in the event of prolonged overcurrent conditions or the like. One device often used in such an overcurrent protection arrangement in the telecommunications field is a so-called "heat coil." The heat coil device normally utilizes a wire-wound bobbin to melt a fusible or meltable link between the bobbin and a rod-like core running through the center of the bobbin. When the current through the wire-wound bobbin generates sufficient heat to melt this link, the movement of the bobbin and center rod element relative to one another will permit other elements of a related assembly to create a permanent short circuit to ground of the protector device. One example of a line protector having such a heat coil is shown in U.S. Pat. No. 3,849,750 which is owned by the same assignee as the present invention.

Some protectors have also employed some type of thermal overload or fail-safe mechanism to create a short circuit to ground in response to heating of the arrester caused by either a sustained overvoltage of a predetermined duration and level or a sudden large current surge. One type of thermal overload mechanism utilizes a fusible (i.e., meltable) element or pellet which is mounted in thermal contact with the surge arrester device. One of a number of arrangements of cooperating grounding elements is provided such that, upon the melting of the fusible element in response to a thermal overload condition, a spring will cause certain elements to shift or move to achieve shunting or shorting across the surge arrester. Examples of several different fail-safe arrangements of this type are shown in U.S. Pat. Nos. 4,314,302; 4,321,649 and 4,901,188 which are owned by the same assignee as the present invention.

While the foregoing prior art thermal overload arrangements have proven commercially successful, there remains room for further improvement. For example, the use of a meltable element as described above requires the correct assembly of the meltable element with the other cooperating parts of the protector assembly. Also, to restore service following activation of the foregoing types of fail-safe systems, such prior art devices require the entire protector assembly to be dismantled, the meltable element to be replaced, and the protector to be correctly re-assembled with a new meltable element.

OBJECTS AND SUMMARY OF THE INVENTION

Accordingly, it is a general object of this invention to provide a novel and improved surge arrester assembly employing a thermal overload arrangement for the protection of electrical and/or communications lines.

A related object is to provide an improved thermal overload arrangement which permits the assembly and/or disassembly of fewer parts in the field, as compared to prior art arrangements.

A related object is to provide an improved thermal overload arrangement which is relatively economical in its design and manufacture, relatively simple to use, and yet highly reliable in operation.

Briefly, in accordance with the invention and in accordance with the foregoing objects, a surge arrester assembly comprises an electrically conductive container having disposed therein a surge arrester and a meltable element; said surge arrester having a first electrode in electrical contact with said container and a second electrode not in electrical contact with said container; and said meltable element comprising an electrically conductive element in thermal contact with said surge arrester so as to melt in response to a selectable level of thermal energy generated by said surge arrester, and said meltable element being located and configured so as to flow in such a manner as to complete an electrical circuit between said first electrode and said second electrode.

BRIEF DESCRIPTION OF THE DRAWINGS

The features of the present invention which are believed to be novel are set forth with particularity in the appended claims. The organization and manner of operation of the invention, together with further objects and advantages thereof may best be understood by reference to the following description, taken in connection with the accompanying drawings in which like reference numerals identify like elements, and in which:

DETAILED DESCRIPTION OF THE ILLUSTRATED EMBODIMENT

Figure 1:
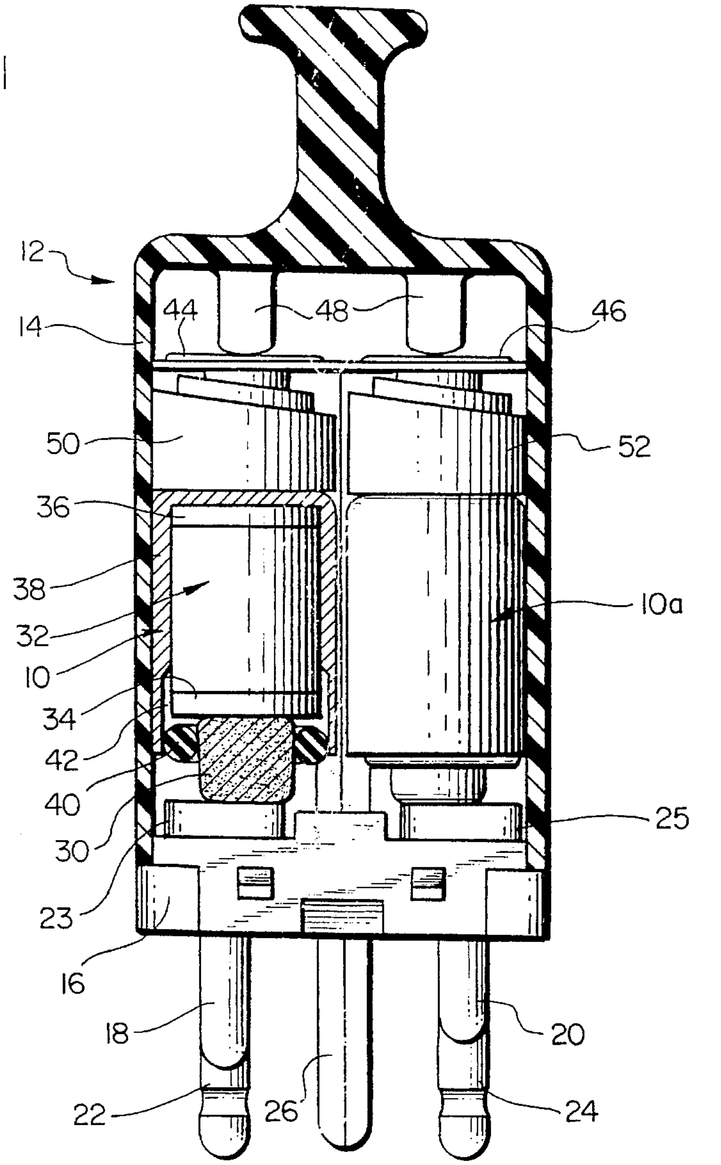
FIG. 1 is a side elevation, partially in section, illustrating protector module having a thermal overload mechanism in accordance with one embodiment of the invention.
Figure 2:
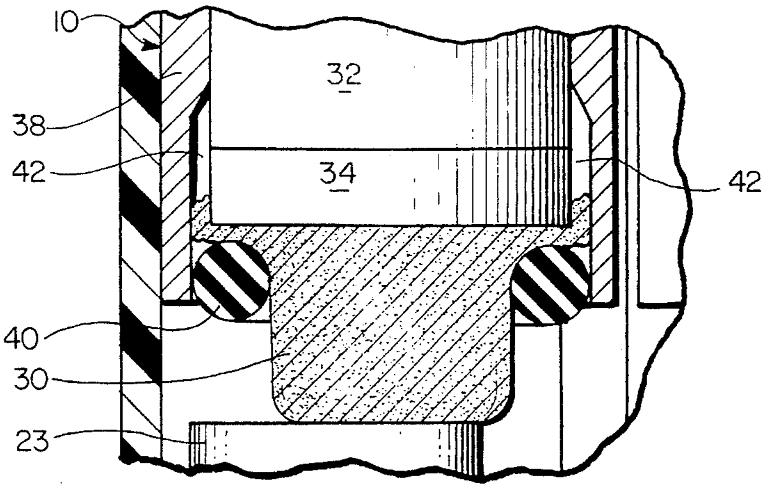
FIG. 2 is an enlarged partial view of a part of the protector module of FIG. 1, illustrating operation of the thermal overload mechanism.
Figure 3:
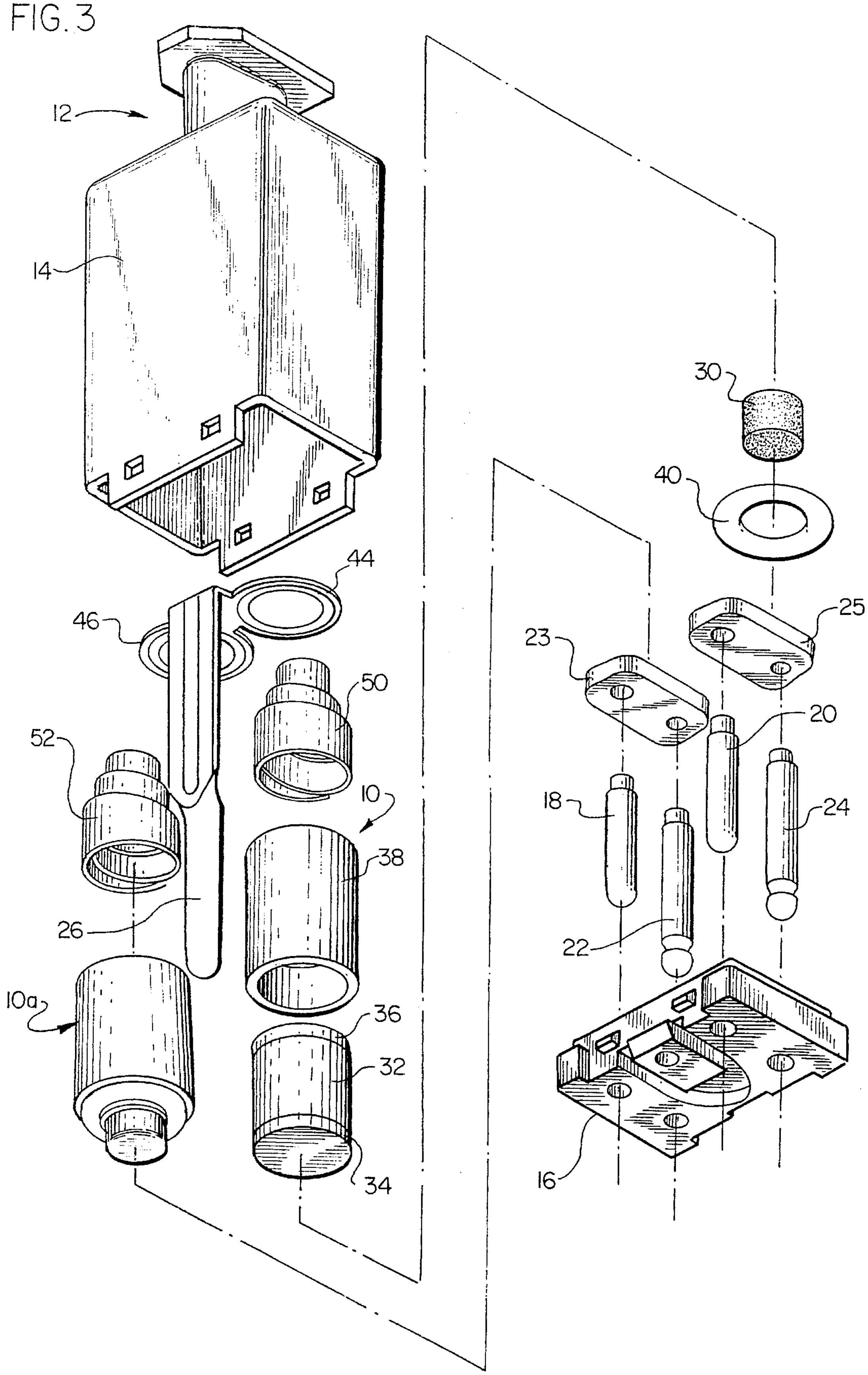
FIG. 3 is an exploded perspective view of the protector module of FIGS. 1 and 2.

Referring now to the drawings, and initially to FIGS. 1–3, a surge arrester 10 in accordance with the invention is shown as part of a protector assembly or module 12. In the illustrated embodiment, the protector module 12 is a five-pin protector module having a nonconductive housing 14 and a base 16 which interfits with and provides a closure for a lower open end of the housing 14. Mounted to the base 16 are a plurality of pins or terminals including a pair of line pins 18, 20, a pair of equipment pins 22, 24 and a ground pin 26. The illustrated protector module 12 houses two substantially identical surge arrester assemblies 10, 10*a*, and hence only the surge arrester assembly 10 will be described in detail herein.

The five-pin module 12 is designed for simultaneously providing line protection for both a tip (T) line and a ring (R) line of a telephone line pair. Accordingly, each line terminal 18, 20 may be connected to one of a tip line or a ring line. The equipment terminals 22, 24 are to be connected to equipment intended to be coupled to the respective tip and ring lines and protected by the protector module 12. The line terminal 18 is internally connected to its associated equipment terminal 22 by a plate 23. A similar plate 25 electrically connects the line terminal 20 to the equipment terminal 24. The protector module 12 is arranged for electrically connecting each arrester assembly 10, 10*a* between a respective one of the tip and ring lines and ground.

The arrester assembly 10 includes a contactor 30 which is in electrical contact with the line terminal 18. An arrester element, which in the illustrated embodiment takes the form of a gas tube arrester 32, has a first electrode 36 in electrical contact with the contactor 30 and a second electrode 34. The gas tube 32 comprises a generally cylindrical, sealed body in which an arc gap of a predetermined size is provided between the electrodes 34 and 36 internally. The arc gap is filled with a selected inert gas to cause arcing across the electrodes 34, 36 when a predetermined voltage or potential is present across the electrodes 34, 36.

The gas tube 32 is in turn housed in a cylindrical cup-like container 38 which has a first or closed end in electrical contact with the electrode 34 and a second or open end at which an O-ring or grommet 40 sealingly engages and mounts the contactor 30 so as to partially project outwardly of the container 38 for contact with the line terminal 18 (at plate 23). The container 38 has either a reduced thickness or a flared out wall portion in the region surrounding the first electrode 34, so as to form a narrow, generally annular secondary arc gap 42 between the container 38 and the electrode 34. This secondary arc gap 42 has been greatly exaggerated in the drawings for purposes of illustration and discussion.

This secondary or "backup" arc gap 42 will permit arcing between the electrode 34 and the container 38 in the event of a voltage across the electrodes 34, 36 of predetermined magnitude, in the event of failure of the gas tube 32. Such failure may occur due to damage or cracking of the tube and loss of the inert gas therein, for example. Generally speaking, the distance across the secondary arc gap 42 is selected to achieve arcing thereacross at a slightly higher voltage than the selected arcing voltage of the gas tube 32. It will be appreciated that arcing across the arc gap 42 cause an electrical short circuit across the electrodes 34, 36, since the upper or closed end of the container 38 is in electrically conductive contact with the electrode 36.

The ground pin 26 of the protector module 12 extends upwardly through the housing 14 and, as best viewed in FIG. 3, is shaped such that it presents a pair of generally circular, dished surfaces 44, 46 at an upper end of the housing. In the illustrated embodiment, the housing 14 includes respective projections 48 which impinge upon upper sides of the dished circular surfaces 44 and 46 and serve to locate and position these surfaces and the terminal or pin 26 relative to the housing 14.

A volute spring 50, 52 is interposed between each of the circular surfaces 44, 46 and the associated arrester assembly 10, 10*a*. Other forms of compression devices or springs may be utilized without departing from the invention, however, a volute spring is preferred due to its ability to carry sustained current and withstand thermal stresses without losing its resilient or compressive properties. It will be seen that the volute spring 50 is compressed between the upper end of the container 38 and the circular dished surface 44.

In accordance with a feature of the invention, in the embodiment of FIGS. 1–3, the contactor 30 comprises a meltable element, for example, a generally cylindrical body of a selected solder material. This material is selected to melt in response to a selectable level of thermal energy generated by the surge arrester or gas tube 32. As best viewed in FIG. 2, when sufficient heat is generated at the surge arrester, the portion of the contactor adjacent the electrode 34 of the surge arrester will first begin to fuse or melt. As this material begins to fuse or melt it will tend to spread around the edges of the electrode 34, relatively quickly flowing into and bridging the secondary or back-up arc gap 42. When this occurs, the solder material will create a short circuit across the gas tube 32, thereby conducting the current responsible for the thermal overload condition to ground and protecting the equipment. The volute spring 52 applies compressive force upon the container 38 and therefore upon the gas tube 32 which in turn is transmitted to the contactor 30 to encourage the material of the contactor to flow into the arc gap 42, when melting occurs.

Selection of the melting temperature of the solder material used to form the contactor 30, results in the selection of a given thermal overload condition at which the thermal overload protection will occur, i.e., melting of the solder and bridging of the secondary arc gap. That is, upon either a sudden current surge such as may be experienced during a lightning strike or surge of A.C. current, or a sustained overvoltage condition, the energy dissipation, and hence the heat buildup in the surge arrester or gas tube 32 will be sufficient to cause the thermal overload operation as just described. Therefore, choice of the solder material for the contactor 30 can be related to a selected level and/or duration of voltage and current on the line at which the thermal overload mechanism will be activated to short the line to ground.

Figure 4:
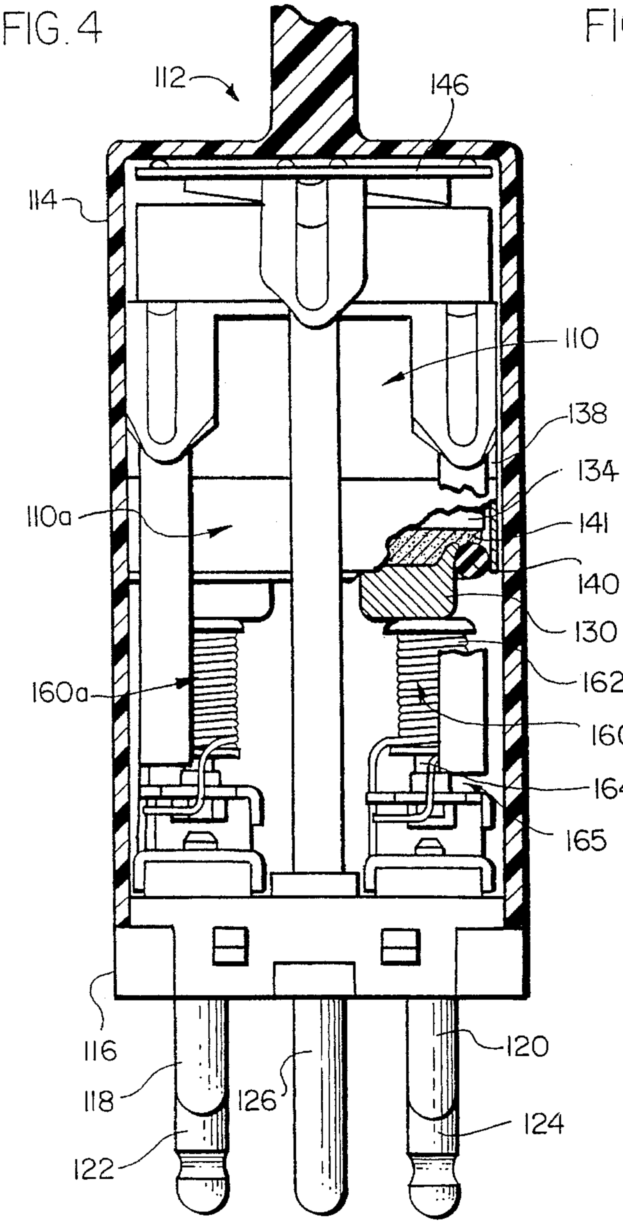
FIG. 4 is a side elevation, partially in section and partially broken away, illustrating a protector module having a thermal overload mechanism in accordance with another embodiment of the invention.
Figure 5:
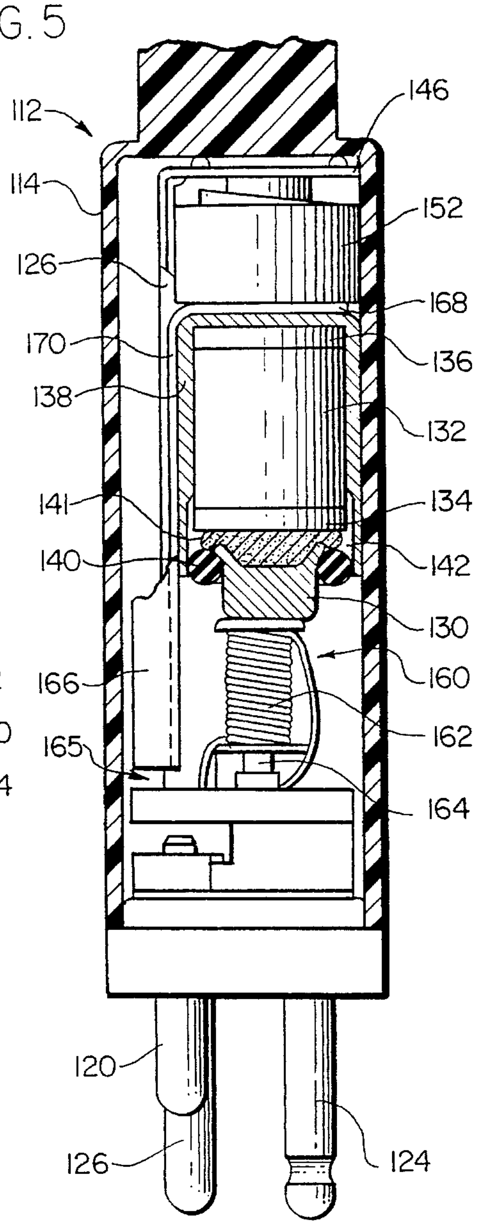
FIG. 5 is a view, partially in section and partially broken away, taken generally along the line 5—5 of FIG. 4.
Figure 6:
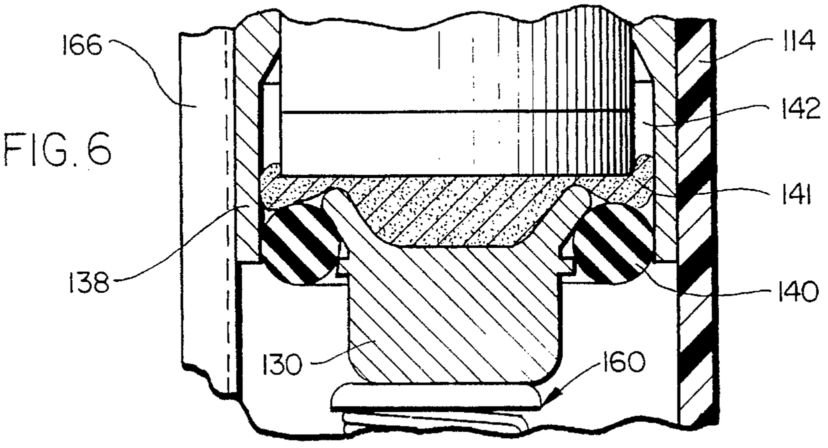
FIG. 6 is an enlarged partial view illustrating the operation of the thermal overload mechanism of FIGS. 4 and 5.

Referring now to FIGS. 4–6, an arrester assembly in accordance with a second embodiment of the invention is designated generally by the reference numeral 110. Generally speaking, it will be recognized that the invention contemplates the provision of a meltable element which is in thermal contact with the surge arrester. This meltable element is located and configured so as to melt in response to a selectable level of thermal energy generated by the surge arrester, in such a manner that the material of the meltable element will flow to complete an electrical circuit between the two electrodes of the surge arrester.

The surge arrester assembly 110 of FIGS. 4–6 is illustrated in connection with a five-pin type of protector module 112, which is similar in many respects to the protector module 12 illustrated in FIGS. 1–3 and described hereinabove. The protector module 112 includes a housing portion 114 having an open end secured to a base 116 which provides a closure and mounts respective line pins 118, 120, associated equipment pins 122, 124 and a ground pin or terminal 126. The protector module 112 houses a pair of identical arrester assemblies 110, 110*a*. Each arrester assembly 110, 110*a* is associated with an overcurrent protector device in the form of a heat coil 160, 160*a*. Only the arrester assembly 110 and heat coil 160 will be described in detail.

In similar fashion to the first embodiment, the arrester assembly 110 comprises a gas tube surge arrester 132 of generally cylindrical shape having opposite electrodes 134 and 136. The gas tube 132 is mounted within a container 138 having a closed end in electrically conductive contact with the electrode 136 and an opposite open end, at which there is defined a generally annular secondary arc gap 142 between the electrode 134 and the container 138. An O-ring 140 engages and mounts a contactor 130 relative to the container 138.

The heat coil 160 comprises a wirewound bobbin 162, which is wired in series between the line and equipment terminals 120, 124, such that current flowing from the line through the equipment must first flow through the heat coil 160. The wirewound bobbin 162 surrounds a central core or rod-like member 164 to which it is joined by a quantity of solder (not shown). When the current in the wirewound bobbin 162 reaches a preselected level, the bobbin will heat sufficiently to melt this solder, whereupon a volute spring 152 will compress the heat coil assembly. This will cause the bobbin 162 to descend a distance sufficient to cause a generally L-shaped grounding member 166 to move close enough to a small gap 165 between a plate 125 coupled with equipment electrode 124. This grounding member 166 has a first or short leg 168 generally interposed between the container 138 of the arrester assembly 110 and the volute spring 152, and a second longer leg 170 which is generally vertically oriented and whose lower end defines an upper edge of the gap 165. The volute spring 152 completes an electrical connection between the grounding element 166 and an upper surface 146 of the ground pin or terminal 126, which is of similar configuration to the ground terminal 26 described above with reference to FIGS. 1–3.

Departing from the first embodiment, the contactor 130 is preferably a solid brass element. As illustrated in FIGS. 4–6 the contactor 130 is shaped to engage and seal relative to the O-ring 140 and also to engage a meltable element 141. The meltable element 141 is preferably in the form of a disc-like solder pellet which is frusto-conical shaped at its central portion to engage a generally complementary frusto-conical depression or recess formed in the facing surface of the contactor 130. The meltable element 141 extends radially outwardly of the contactor 130 somewhat and has an opposite generally flat surface which contacts a flat facing surface of the electrode 134 of the gas tube 132.

As best viewed in FIG. 6, upon occurrence of an overvoltage condition of sufficient duration or a sudden current surge causing sufficient heating of the gas tube 132, the solder pellet 141 will begin to melt, flowing into and bridging the arc gap 142. The compressive force supplied by the volute spring 152 may enhance this spreading or flowing into the arc gap 142 by the meltable element 141 as melting occurs. Thus, in the embodiment of FIGS. 4–6 the meltable element is located and configured to cause a short circuit across the electrodes of the surge arrester in response to a selectable level of thermal energy generated by the arrester. As mentioned hereinabove, the choice of the solder material for formation of the pellet or meltable element 141 will determine its melting point. This melting point in turn can be related to a predetermined duration of voltage, or level of current surge at which the surge arrester 132 will generate sufficient thermal energy to melt the meltable element solder pellet 141. Thus, choice of a melting point of the meltable element 141 can be related to a selected level and/or duration of voltage and current on the line at which the thermal overload mechanism will be activated to short the line to ground.

Generally speaking, the embodiment shown in FIGS. 1–3 is suitable for use in any protector module or assembly in which the contactor 30 will be engaged with a substantially flat surface, that is in a surface contact. On the other hand, the use of the second embodiment shown in FIGS. 4–6 may be preferred in situations where the contactor will be in contact with a very small surface or in a line contact situation. In the case of the heat coil 160, the upper end of the heat coil is of a generally annular shape, such that it contacts the contactor 130 in a generally circular line of contact, rather than in a surface contact. Under such conditions, the brass contactor is preferred, because the pressure of engagement along a line contact may cause cold flow or deformation of a solder contactor of the type used in the embodiment FIGS. 1–3.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A surge arrester assembly comprising: a surge arrester for shorting a line to ground in response to an over-voltage condition on the line, a thermal overload device for creating an electrical short circuit across said surge arrester in response to a selectable level of thermal energy at the surge arrester, and an electrically conductive container having disposed therein said surge arrester and said thermal overload device; said surge arrester having a first electrode in electrical contact with said container and a second electrode spaced away from said container; and said thermal overload device comprising an electrically conductive meltable element in thermal contact with said surge arrester so as to melt and flow in response to a selectable level of thermal energy generated by said surge arrester, and said meltable element being located and configured so as to flow between and contact said second electrode and said container.

2. A surge arrester assembly according to claim 1 wherein said container comprises a generally cylindrical cup-like container having one open end and an opposite closed end.

3. A surge arrester assembly according to claim 2 wherein said container has larger diameter than the diameter of said surge arrester at least in a region surrounding said second electrode, thereby defining an air discharge gap between said second electrode and said container.

4. A surge arrester assembly according to claim 1 wherein said surge arrester comprises a gas tube.

5. A surge arrester assembly according to claim 1 further including an air discharge gap electrically interposed between said second electrode and said first electrode, said air discharge gap defining an arcing voltage higher than the breakdown voltage of said surge arrester.

6. A surge arrester assembly according to claim 5 wherein said container has larger cross-sectional dimensions than said surge arrester in a region surrounding said second electrode thereby defining said air discharge gap between said second electrode and said container, and wherein said meltable element is located and configured so as to flow into said gap and into electrical contact with both said container and said second electrode.

7. A surge arrester assembly according to claim 1 and further including a contactor in electrical contact with said second electrode and electrically insulated from said container and projecting outwardly of said container.

8. A surge arrester according to claim 7 wherein said meltable element is mounted between said second electrode and said contactor.

9. A surge arrester assembly according to claim 8 wherein said contactor has a recessed portion and wherein said meltable element has at least a portion of complementary shape for interfitting with said recessed portion.

10. A surge arrester assembly according to claim 7 and further including a sealing means for sealing said surge arrester within said container.

11. A surge arrester assembly according to claim 10 wherein said sealing means engages a perimeter area of said contactor.

12. A surge arrester assembly according to claim 1 wherein said meltable element comprises a contactor in electrical contact with said second electrode and electrically insulated from said container and projecting outwardly of said container.

13. A line protector comprising: a housing and a surge arrester assembly mounted in said housing; said surge arrester assembly comprising an electrically conductive container having disposed therein a surge arrester and a meltable element; said surge arrester having a first electrode in electrical contact with said container and a second electrode spaced away from said container; and said meltable element comprising an electrically conductive element in thermal contact with said surge arrester so as to melt in response to a selectable level of thermal energy generated by said surge arrester, and said meltable element being located and configured so as to flow between and contact said second electrode and said container; a contactor spaced from said second electrode and said container; said meltable element being positioned between coupled to said second electrode and said contactor; and means for urging said surge arrester toward said contactor.

14. A line protector assembly according to claim 13 wherein said urging means comprises a compression spring operatively interposed between said housing and said container.

15. A line protector assembly according to claim 14 wherein said compression spring comprises a volute spring.

16. A line protector comprising: a housing and a surge arrester assembly mounted in said housing; said surge arrester assembly comprising an electrically conductive container having disposed therein a surge arrester and a meltable element; said surge arrester having a first electrode in electrical contact with said container and a second electrode spaced away said container; and said meltable element comprising an electrically conductive element in thermal and electrical contact with said surge arrester so as to melt in response to a selectable level of thermal energy generated by said surge arrester, and said meltable element being located and configured so as to flow between and contact said second electrode and said container; wherein said meltable element comprises a contactor in electrical contact with said second electrode and electrically insulated from said container and projecting outwardly of said container; and further including means for urging said surge arrester toward said contactor.

17. A line protector assembly according to claim 16 wherein said urging means comprises a compression spring operatively interposed between said housing and said container.

18. A line protector assembly according to claim 17 wherein said compression spring comprises a volute spring.

* * * * *